US006842619B2

United States Patent
Lee et al.

(10) Patent No.: US 6,842,619 B2
(45) Date of Patent: Jan. 11, 2005

(54) TELECOMMUNICATIONS SYSTEM AND METHOD FOR LOAD SHARING WITHIN A CODE DIVISION MULTIPLE ACCESS 2000 NETWORK

(75) Inventors: Bo Lee, Plano, TX (US); Jan Kransmo, Plano, TX (US)

(73) Assignee: Ericsson Inc., Plano, TX (US)

( * ) Notice: Subject to any disclaimer, the term of this patent is extended or adjusted under 35 U.S.C. 154(b) by 581 days.

(21) Appl. No.: 09/909,192

(22) Filed: Jul. 19, 2001

(65) Prior Publication Data

US 2003/0017831 A1 Jan. 23, 2003

(51) Int. Cl.[7] ............................................. H04Q 7/20
(52) U.S. Cl. ..................................... 455/453; 455/436
(58) Field of Search ................................ 455/453, 450, 455/452.1, 452.2, 436–437, 445–447, 434; 370/320, 341, 332

(56) References Cited

U.S. PATENT DOCUMENTS

| 5,649,293 | A | | 7/1997 | Reed | |
|---|---|---|---|---|---|
| 6,324,401 | B1 | * | 11/2001 | De Hoz Garcia-Bellido et al. | 455/442 |
| 6,671,512 | B2 | * | 12/2003 | Laakso | 455/453 |
| 6,678,257 | B1 | * | 1/2004 | Vijayan et al. | 370/320 |
| 6,741,862 | B2 | * | 5/2004 | Chung et al. | 455/452.1 |
| 2002/0068588 | A1 | | 6/2002 | Hideo et al. | |

FOREIGN PATENT DOCUMENTS

| WO | WO 96/38011 | | 11/1996 | |
|---|---|---|---|---|
| WO | WO 97/44925 | | 11/1997 | |
| WO | WO 98/24199 | * | 4/1998 | H04B/17/00 |
| WO | WO 00/42810 | * | 7/2000 | H04B/7/38 |
| WO | WO 00/54430 | * | 9/2000 | H04B/7/005 |

OTHER PUBLICATIONS

Mullany F J: "High–Speed Downlink Access in 3G Systems: A Portent for the Evolution of 4G Systems?" Wireless Personal Communication, Kluwer Academic Publishers, NL vol. 17, No. 2/3, Jun. 2001, pp. 225–235, XP001030367 ISSN: 0929–6212 p. 226, paragraph 2–p. 229, paragraph 2.2.2.

* cited by examiner

Primary Examiner—William Trost
Assistant Examiner—Brandon J. Miller

(57) ABSTRACT

A telecommunications system and method is disclosed for load sharing within a CDMA2000 network. The queue size of a sector (or cell) is compared with a predefined threshold. If the queue size exceeds the predefined threshold, one or more mobile terminals having their Data Rate Control (DRC) pointed towards that sector are selected to discontinue using that sector. The network transmits a message to the selected mobile terminals informing the selected mobile terminals that their DRC is no longer valid. In response, the selected mobile terminals stop pointing their DRC towards that sector, which results in an interruption of the selected mobile terminal's data sessions. To continue their data sessions, each of the selected mobile terminals may initiate a "virtual" handoff to another sector.

26 Claims, 6 Drawing Sheets

| Field | Setting |
|---|---|
| Message ID | Quick Config |
| Color Code | Sector 1 Color Code |
| Sector ID | Sector 1 ID |
| Sector Signature | Next Sector Parameters Message |
| Access Signature | Access Parameters Message |
| Redirect | No |
| RPC Count | Max. Number of Channels |
| DRC Lock | 0 |
| Forward Traffic Valid | 1 |
| Reserved | MAC Index of MTA |

TELECOMMUNICATIONS SYSTEM AND METHOD FOR LOAD SHARING WITHIN A CODE DIVISION MULTIPLE ACCESS 2000 NETWORK

BACKGROUND OF THE PRESENT INVENTION

1. Field of the Invention

The present invention relates generally to code division multiple access (CDMA) networks, and specifically to load sharing within a CDMA2000 network.

2. Description of Related Art

High Data Rate (HDR) is a technology originally developed for dedicated packet data applications to meet the increasing demand for wireless Internet Protocol (IP) connectivity with high spectral efficiency. Voice transmissions require low data rates, but maintain stringent delay and jitter requirements. Packet data transmissions, on the other hand, typically require bursty high data rates, with less stringent delay and jitter requirements. The HDR principle is to separate high-speed data completely from the voice network, so that the packet data requirements can be fulfilled optimally and independently.

In May 2000, the CDMA Development Group (CDG) accepted HDR as the 1× Evaluation Phase One: Data Only (1×Ev DO or 1×EV Phase 1), with minor requirements for improvements. Within the 1×Ev DO network, an HDR base station, whether a stand-alone node or integrated within a voice base station, operates on a 1.25 MHZ carrier that is allocated for packet data only.

The HDR base station further employs a single shared, time division multiplexed (TDM) forward link, where only a single terminal is served at any instance. The forward link throughput rate is shared by all HDR mobile terminals. A mobile terminal selects a serving sector (or cell) of the base station by pointing its Data Rate Control (DRC) to the sector and requesting a forward data rate according to the channel condition (i.e., based on the Carrier to Interference (C/I) ratio of the channel).

A multi-user scheduler at the HDR base station is responsible for granting actual data rates to each mobile terminal. The multi-user scheduler within the HDR base station "fairly" distributes the throughput rate for all mobile terminals pointing their DRC's on the same sector. However, each mobile terminal's data through rate is relative to the number of other mobile terminals and the throughput rate of the other mobile terminals. Since a mobile is blind to the amount of traffic in its sector and adjacent sectors, the consequence is that some sectors may be heavily loaded and others may be under loaded.

Previous load sharing methods require the network to select another sector or cell for handoff of one or more subscribers. For example, in PCT Application WO 97/44925, which is hereby incorporated by reference, when a load threshold is exceeded, the network directs a mobile terminal to another cell by channel allocation. As another example, in PCT Application WO 96/38011, which is hereby incorporated by reference, mobile terminals are off-loaded to an alternate sector of the base station when a current sector of the base station becomes loaded beyond a loading threshold.

However, in the CDMA2000 network, handoffs to other sectors or other HDR base stations are not initiated by the network. Instead, in the CDMA2000 network, "virtual" handoffs are performed by the mobile terminals themselves. By "virtual", it is meant that when the channel conditions of the current sector selected by the mobile terminal are no longer satisfactory to the mobile terminal, the mobile terminal itself selects another sector by pointing its DRC towards a new sector. Queued data in the old sector is either retrieved by the new sector or flushed and retransmitted to the new sector. Therefore, there is no current mechanism within the CDMA2000 network for the network to initiate a handoff to another sector or HDR base station based on load conditions.

SUMMARY OF THE INVENTION

A telecommunications system and method is disclosed for load sharing within a CDMA2000 network. The queue size of a sector is compared with a predefined threshold. If the queue size exceeds the predefined threshold, one or more mobile terminals having their Data Rate Control (DRC) pointed towards that sector are selected to discontinue using that sector. The network transmits a message to the selected mobile terminals informing the selected mobile terminals that their DRC is no longer valid. In response, the selected mobile terminals stop pointing their DRC towards that sector, which results in an interruption of the data sessions of the selected mobile terminals. To continue their data sessions, each of the selected mobile terminals may initiate a "virtual" handoff to another sector.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS

The numerous innovative teachings of the present application will be described with particular reference to the exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
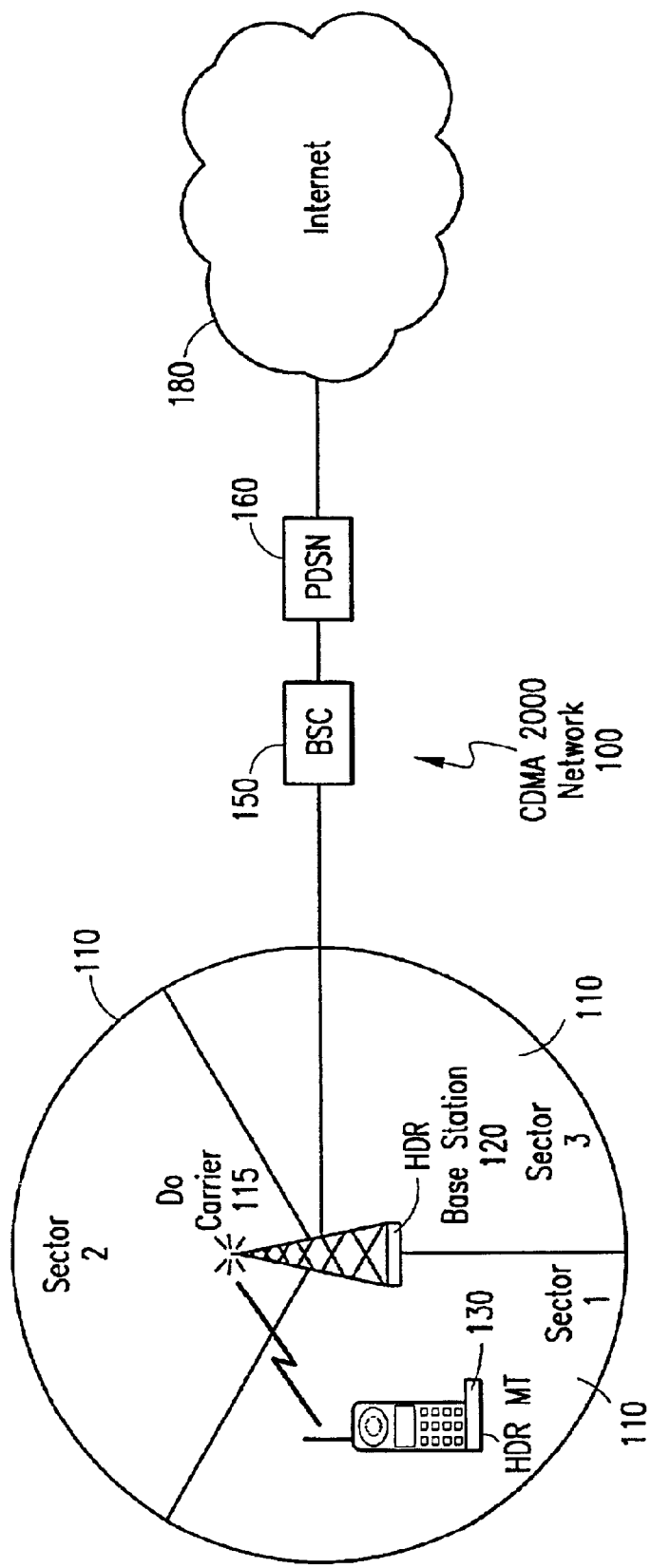
FIG. 1 is a block diagram of a Code Division Multiple Access 2000 (CDMA2000) network implementing a High Data Rate (HDR) base station.

FIG. 1 illustrates a Code Division Multiple Access 2000 (CDMA2000) network 100. The CDMA2000 network 100 supports data rates up to 2 Mbps per user and uses higher order modulation schemes and a High Data Rate (HDR) base station 120 to support such high data rates. It should be understood that the base station 120 provides the RF interface (carrier 115) between a mobile terminal 130 and the network 100 via one or more transceivers. The HDR base station 120 provides a separate 1.25 MHZ data only (DO) carrier 115 for HDR applications for each sector 110 (or cell) served by the HDR base station 120. A separate base station or carrier (not shown) provides the voice carrier(s) for voice applications.

A HDR mobile terminal 130 may be a DO mobile terminal or a dual mode mobile terminal capable of utilizing both voice services and data services. To engage in a data session, the HDR mobile terminal 130 connects to a DO carrier 115 to use the DO high-speed data service. The data session is controlled by a Packet Data Service Node (PDSN) 160, which routes all data packets between the HDR mobile terminal 130 and the Internet 180. The PDSN 160 has a direct connection to a Packet Control Function (PCF) (not shown), which interfaces with a Base Station Controller (BSC) 150 of the HDR base station 120. The BSC 150 is responsible for operation, maintenance and administration of the HDR base station 120, speech coding, rate adaptation and handling of the radio resources. It should be understood that the BSC 150 may be a separate node or may be co-located with one or more HDR base stations 120.

Each HDR base station 120 is shown serving three sectors 115 (or cells). However, it should be understood that each HDR base station 120 may serve only a single cell (referred to as an omni cell). It should also be understood that the network 100 may include multiple HDR base stations 120, each serving one or more sectors 115, with HDR mobile terminals 130 being capable of handing off between sectors 115 of the same HDR base station 120 or sectors 115 of different HDR base stations 120. For each sector 115 (or cell), the HDR base station 120 further employs a single shared, time division multiplexed (TDM) forward link, where only a single HDR mobile terminal 130 is served at any instance. The forward link throughput rate is shared by all HDR mobile terminals 130. A HDR mobile terminal 130 selects a serving sector 115 (or cell) of the HDR base station 120 by pointing its Data Rate Control (DRC) towards the sector 115 and requesting a forward data rate according to the channel conditions (i.e., based on the Carrier to Interference (C/I) ratio of the channel).

A multi-user scheduler at the HDR base station 120 is responsible for granting actual data rates to each HDR mobile terminal 130. The multi-user scheduler within the HDR base station 120 "fairly" distributes the throughput rate for all HDR mobile terminals 130 pointing their DRC's towards the same sector 115. However, each HDR mobile terminal's 130 data through rate is relative to the number of other HDR mobile terminals 130 and the throughput rate of the other HDR mobile terminals 130. Since an HDR mobile terminal 130 is blind to the amount of traffic in its sector 115 and adjacent sectors 115, the consequence is that some sectors 115 may be heavily loaded and others may be under loaded.

Figure 2A:
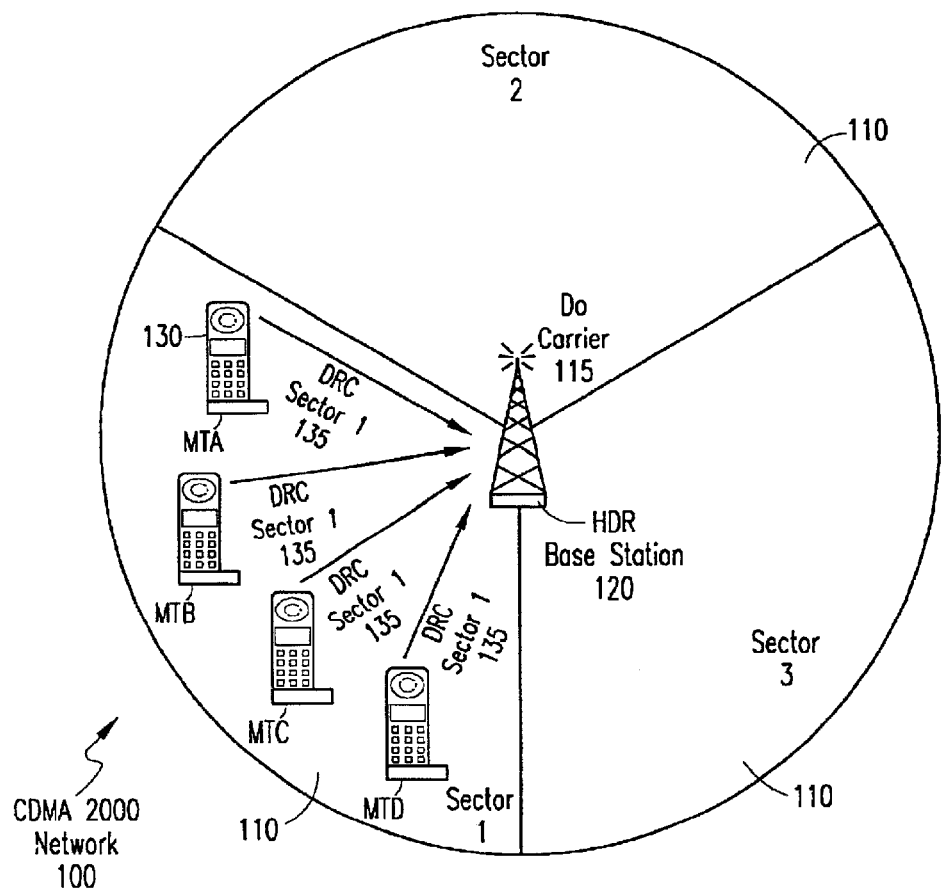
FIG. 2A is a block diagram of an HDR base station serving multiple HDR mobile terminals in accordance with exemplary embodiments of the present invention.

Reference is now made to FIGS. 2A–2E, which illustrate an exemplary load sharing process for CDMA2000 networks 100, in accordance with embodiments of the present invention. FIG. 2A shows an HDR base station 120 serving multiple HDR mobile terminals 130 (MT-A, MT-B, MT-C and MT-D), each having their DRC 135 pointed at one sector 115 (sector 1) of the HDR base station 120. The Default Forward Traffic Channel Medium Access Control (MAC) Protocol of the CDMA2000 network 100 defines the procedures required for the HDR base station 120 to transmit and the HDR mobile terminal 130 to receive the Forward Traffic Channel. This protocol operates in one of three states:

(1) Inactive State: In this state, the HDR mobile terminal 130 is not assigned a Forward Traffic Channel.

(2) Variable Rate State: In this state, the HDR base station 120 transmits the Forward Traffic Channel to the HDR mobile terminal 130 at a variable rate, as a function of the HDR mobile terminal's DRC 135 value.

(3) Fixed Rate State: In this state, the HDR base station 120 transmits the Forward Traffic Channel to the HDR mobile terminal 130 from one particular sector 115, at one particular rate.

In the Variable Rate State, the HDR mobile terminal 130 points it's DRC 135 towards a sector 115 of the HDR base station 120. The DRC 135 is transmitted by the HDR mobile terminal 130 to the HDR base station 120, and includes a DRC cover index and a DRC value. The HDR mobile terminal 130 uses the DRC cover index to specify the transmitting sector 115 preferred by the HDR mobile terminal 130. In the Fixed Rate State, the DRC cover index and the data rate are specified in a message (Fixed Mode Request) sent by the HDR mobile terminal 130 (i.e., in fixed mode, the HDR mobile terminal "points" it's DRC using a message instead of the DRC channel transmission used for variable rate mode).

The DRC cover index is either set to "0", which is called the "null cover", or is set to the DRC cover of the preferred sector 115. The DRC value specifies the requested transmission rate for variable rate mode or fixed rate mode. Typically, the HDR mobile terminal 130 sets the DRC value to the maximum desired value that channel conditions permit for the sector 115 at which the HDR mobile terminal 130 is pointing its DRC 135. The maximum throughput rate for an HDR mobile terminal is dependent upon the number of HDR mobile terminals 130 on that sector 115 and the throughput rate of the other HDR mobile terminals 130 on that sector 115.

Once the HDR mobile terminal 130 has pointed it's DRC 135 towards a particular sector 115 specifying a requested rate, the HDR base station 120 transmits data packets to the HDR mobile terminal 130 on the forward traffic channel at the requested data rate. As discussed above, transmission on the forward traffic channel is time division multiplexed. At any given time, the forward traffic channel is being either transmitted or not; and if it is being transmitted, it is addressed to a single HDR mobile terminal 130. When transmitting on the forward traffic channel, the HDR base station 120 uses a MACIndex associated with a particular HDR mobile terminal 130 to identify the target HDR mobile terminal 130 for the data packets.

Although each HDR mobile terminal 130 specifies its own data rate (DRC value) for forward link transmissions, as shown in FIG. 2A, if HDR mobile terminals MT-A, MT-B, MT-C and MT-D all point their DRC's 135 to sector 1 specifying respective requested rates, and no other sectors 115 (e.g., sectors 2 and 3) of the HDR base station 120 have any HDR mobile terminals 130 pointing their DRC's 135 towards those sectors 115, the result is that sector 1 may become over-loaded with a low average data throughput rate, while sectors 2 and 3 remain under-loaded.

Figure 2B:
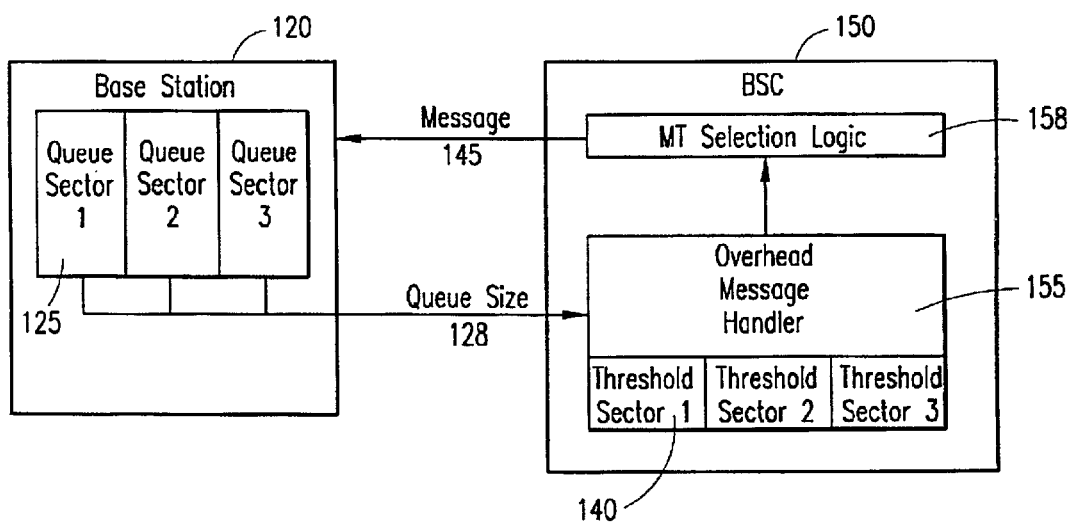
FIG. 2B is a block diagram illustrating an exemplary load sharing process in accordance with embodiments of the present invention.

In order to balance the load amongst the sectors 115 of the HDR base station 120 (or sectors 115 of adjacent HDR base stations 120), a load sharing mechanism is needed. FIG. 2B illustrates such an exemplary load sharing process in accordance with embodiments of the present invention. Each sector 115 of the HDR base station 120 maintains a queue 125 of data packets waiting to be transmitted to HDR mobile terminals 130 pointing their DRC's 135 towards that sector 115. Since the forward traffic channel is time division multiplexed, and a particular HDR mobile terminal 130 receives data packets only in one time slot, each data packet received for a particular HDR mobile terminal 130 must be queued at the HDR base station 120 until the time slot assigned to that particular HDR mobile terminal 130 arrives. It should be noted that multiple time slots may be assigned to a particular HDR mobile terminal 130 to make up the forward link channel of the HDR mobile terminal 130, depending upon the requested data rate.

The queue size 128 of each sector 115 is periodically reported to an overhead message handler 155 within the BSC 150. Each vendor may measure the queue size 128 differently based on the way the vendor 2; implements the HDR base station. 120 For example, the queue size 128 may be measured as the number of data packets waiting to be transmitted. Furthermore, the queue size may be based solely on the number of HDR mobile terminals 130 having their DRC 135 pointed towards that sector 115.

The overhead message handler 155 compares the queue size 128 of a particular sector 115 with a predefined threshold 140 for that sector 115. If the threshold 140 for a sector 115 is exceeded, mobile terminal (MT) selection logic 158 analyzes various factors to select one or more HDR mobile terminals 130 to discontinue using that sector 115. Such factors may include the queue size for each of the HDR mobile terminals 130, the active set size (i.e., number of other sectors 115 available) of the HDR mobile terminals 130, the requested rate of each of the HDR mobile terminals 130, the order that each of the HDR mobile terminals 130 pointed their DRC 135 towards that sector 115, the C/I ratio experienced by each of the HDR mobile terminals 130 on the forward link, the position of each of the HDR mobile terminals 130 (i.e., the latitude and longitude of each of the HDR mobile terminals 130 as determined by a Global Positioning System (GPS) receiver or other type of positioning system) and the type of HDR mobile terminal 130 (e.g., either DO or dual mode). For example, an HDR mobile terminal 130 connected to the sector 115, but having little or not data queued may be selected first for not pointing its DRC 135 towards the sector 115.

Figures 2C, 2D:
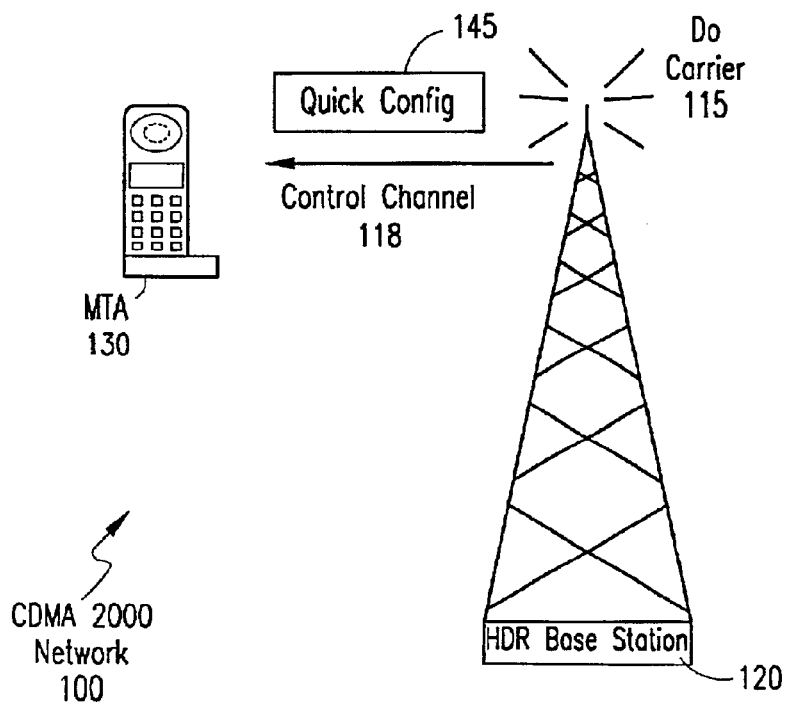
FIG. 2C is a block diagram illustrating the transmission of a message to a mobile terminal after completion of the load sharing process of FIG. 2B.
FIG. 2D illustrates the setting of each of the fields in the message shown in FIG. 2C of the drawings.

As shown in FIGS. 2B and 2C, the BSC 150 transmits to each of the selected HDR mobile terminals 130 a message 145 indicating that the selected HDR mobile terminals 130 should stop pointing their DRC 135 towards that sector 115. The message 145 is preferably transmitted on a control channel 118 of the forward link of the HDR base station 120. Each control channel packet contains zero or more control packets for zero or more HDR mobile terminals 130. The control packets include messages 145 that are broadcast to HDR mobile terminals 130 within the sector 115 over the control channel 118.

One type of message 145 included in a control packet is an overhead message. The overhead messages in the CDMA2000 network 100 include the QuickConfig message 145 and the SectorParameters message. The QuickConfig message 145 is used to indicate a change in the contents of the overhead messages and to provide frequently changing information. The SectorParameters message is used to convey sector specific information to the HDR mobile terminals 130.

As shown in FIG. 2D, the QuickConfig message 145 includes a number of fields 148 and a setting 149 for each of the fields 148. The Message ID field indicates that the message is a QuickConfig message. The Color Code and Sector ID fields indicate the color code and ID of the sector 115 transmitting the QuickConfig message 145. The Sector Signature field is set to the value of the Sector Signature field of the next SectorParameters message that will be transmitted. Similarly, the Access Signature field is set to the value of the Access Signature parameter from the AccessParameters message, which is transmitted on an Access Channel (not shown) of the forward link. The Redirect field is used to indicate whether or not the network 100 is redirecting all HDR mobile terminals 130 away from the sector 115.

The RPC Count field is set to the maximum number of Reverse Power Control (RPC) channels supported by the sector 115. For each RPC Count occurrence (i.e., for each HDR mobile terminal), a DRC Lock field is set to "1" if the network 100 has received a valid DRC 135 from the HDR mobile terminal 130 that has been assigned a MACIndex. Each occurrence n of the DRC Lock field is associated with MACIndex 64-n (e.g., occurrence 1 of this field corresponds to MACIndex 63). Otherwise, the DRC Lock field is set to "0". Similarly, for each RPC Count occurrence n, a Forward Traffic Valid field is set to "1" if the forward traffic channel associated with MACIndex 64-n is valid. The Reserved field includes six bits and is usually set to zero.

In the example of FIGS. 2C and 2D, the selected HDR mobile terminal 130 is MT-A. The active set of MT-A includes more than one sector 115, which may be served by one or more HDR base stations 120 (only one of which is shown). To inform MT-A to not point its DRC 135 towards sector 1, the HDR base station 120 transmits a modified QuickConfig message 145 to MT-A. In the modified QuickConfig message 145, the bit in the DRC Lock field at the RPC count associated with MT-A is set to "0", which instructs MT-A to stop pointing its DRC 135 at sector 1. In addition, instead of setting the Reserved field to zero, the Reserved field is set to the MACIndex of MT-A to distinguish the message from an ordinary fixed rate message.

Upon the reception of QuickConfig message 145, the HDR mobile terminal 130 (MT-A) specified by the MACIndex in the Reserved field updates its DRC cover index to "0" or "null cover", which indicates that the HDR mobile terminal 130 is not pointing its DRC 135 towards any sector 115. However, from the network perspective, MT-A is still connected to sector 1 until MT-A points its DRC 135 towards another sector 115. Any new incoming data packets for MT-A are queued by the HDR base station 120 and transmitted later by the network 100. Any queued data packets currently within the HDR base station 120 are either flushed and retransmitted later by the network 100 or transferred to a new sector 115 (if MT-A connects to a new sector 115).

Figure 2E:
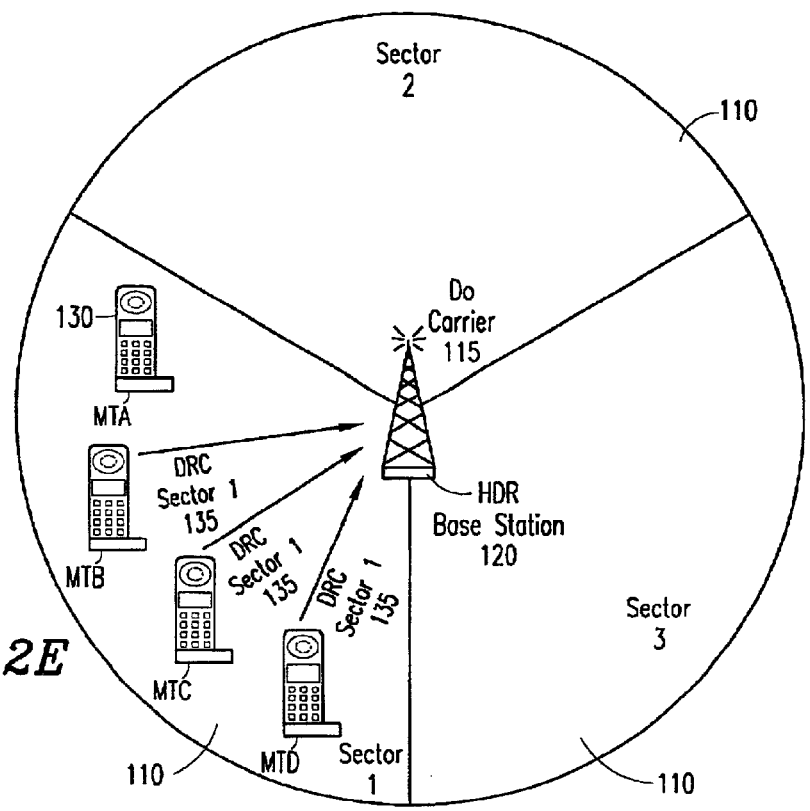
FIG. 2E is a block diagram illustrating the HDR base station and HDR mobile terminals of FIG. 2B after the transmission of the message shown in FIGS. 2C and 2D.

FIG. 2E illustrates the status of the HDR mobile terminals MT-A, MT-B, MT-C and MT-D after transmission of the QuickConfig message 145 discussed above in connection with in FIGS. 2C and 2D. As can be seen, MT-B, MT-C and MT-D all still have their DRC's 135 pointed towards sector 1. However, MT-A does not have it's DRC 135 pointed towards sector 1. Instead, MT-A's DRC 135 is not pointed towards any sector 115.

Figure 3:
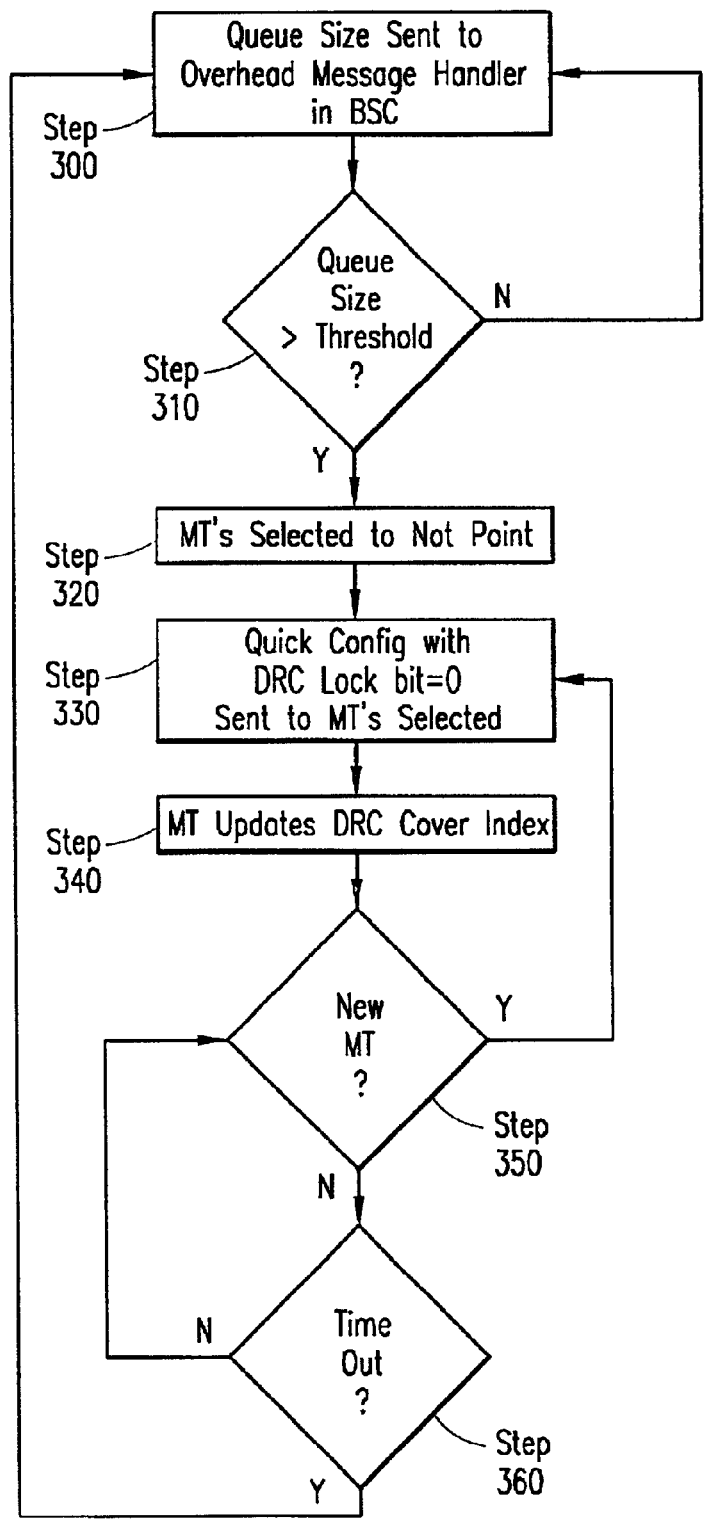
FIG. 3 is a flow chart illustrating exemplary steps for performing the load sharing process in accordance with embodiments of the present invention.

Reference is now made to FIG. 3 of the drawings, where the exemplary steps for performing the load sharing process are shown. Once the queue size of a sector is sent to the Overhead Message Handler in the BSC (step 300), the queue size is compared with a predefined threshold for that sector (step 310). If the queue size is greater than the threshold, one or more HDR mobile terminals are selected to not point their DRC's towards the sector (step 320). All of the selected HDR mobile terminals are sent the modified QuickConfig message with the DRC Lock bit set to "0" (step 330). In response to receiving the modified QuickConfig message, all of the selected HDR mobile terminals update their DRC cover index to "0" (step 340).

If any new HDR mobile terminals point their DRC towards the sector (step 350), these new HDR mobile terminals also receive the QuickConfig message with the DRC Lock bit set to "0" (step 330) and update their DRC cover index accordingly (step 340). After the expiration of a timer (step 360), or after a request by the BSC, the HDR base station once again transmits the queue size of the sector to the Overhead Message Handler in the BSC (step 300).

When the selected HDR mobile terminals receive the modified QuickConfig message, the data sessions for those HDR mobile terminals are interrupted (since data packets are no longer transmitted on the forward traffic channel). To continue the data session, the HDR mobile terminal must point its DRC towards another sector of the same HDR base station or a different HDR base station.

Figure 4:
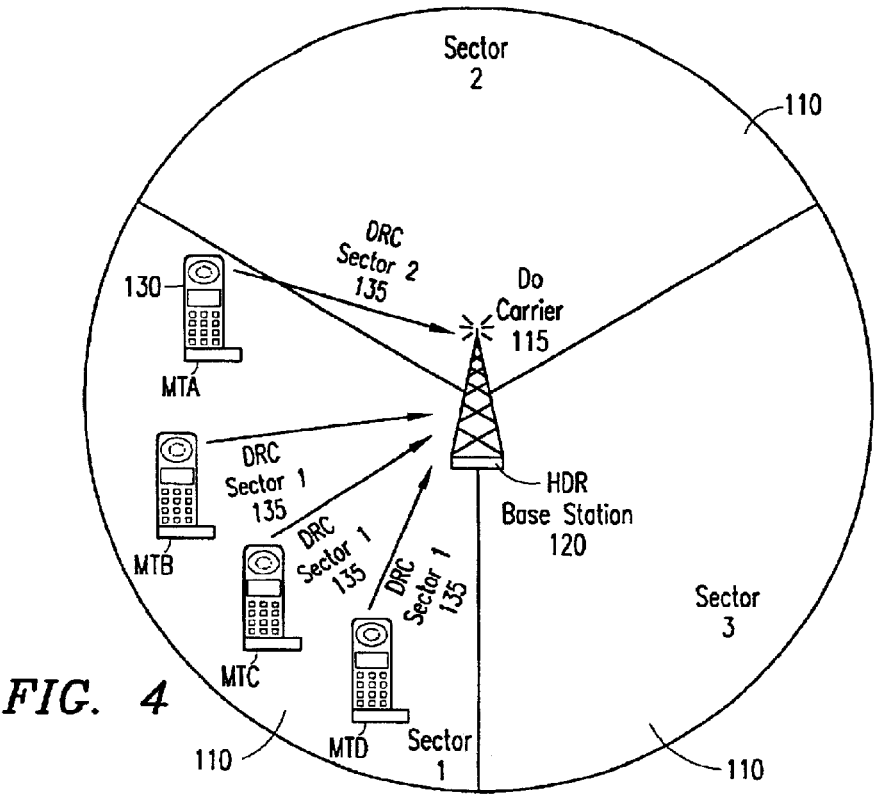
FIG. 4 is a block diagram illustrating a "virtual" handoff after the load sharing process of FIGS. 2B–2E has been completed.

As shown in FIG. 4 of the drawings, MT-A may continue its data session by pointing its DRC 135 towards another sector 115 (here sector 2). Since MT-A is near an edge of sector 1 (which may have been one factor considered when selecting MT-A), the C/I ratio of sector 2 may be at a level sufficient to support a data rate requested by MT-A. To connect to sector 2, MT-A performs a "virtual" handoff by pointing its DRC 135 towards sector 2 and requesting the maximum data rate needed by MT-A and allowed by sector 2. Queued data in sector 1 is either retrieved by sector 2 or flushed and retransmitted to sector 2 by the PDSN (shown in FIG. 1).

Figure 5:
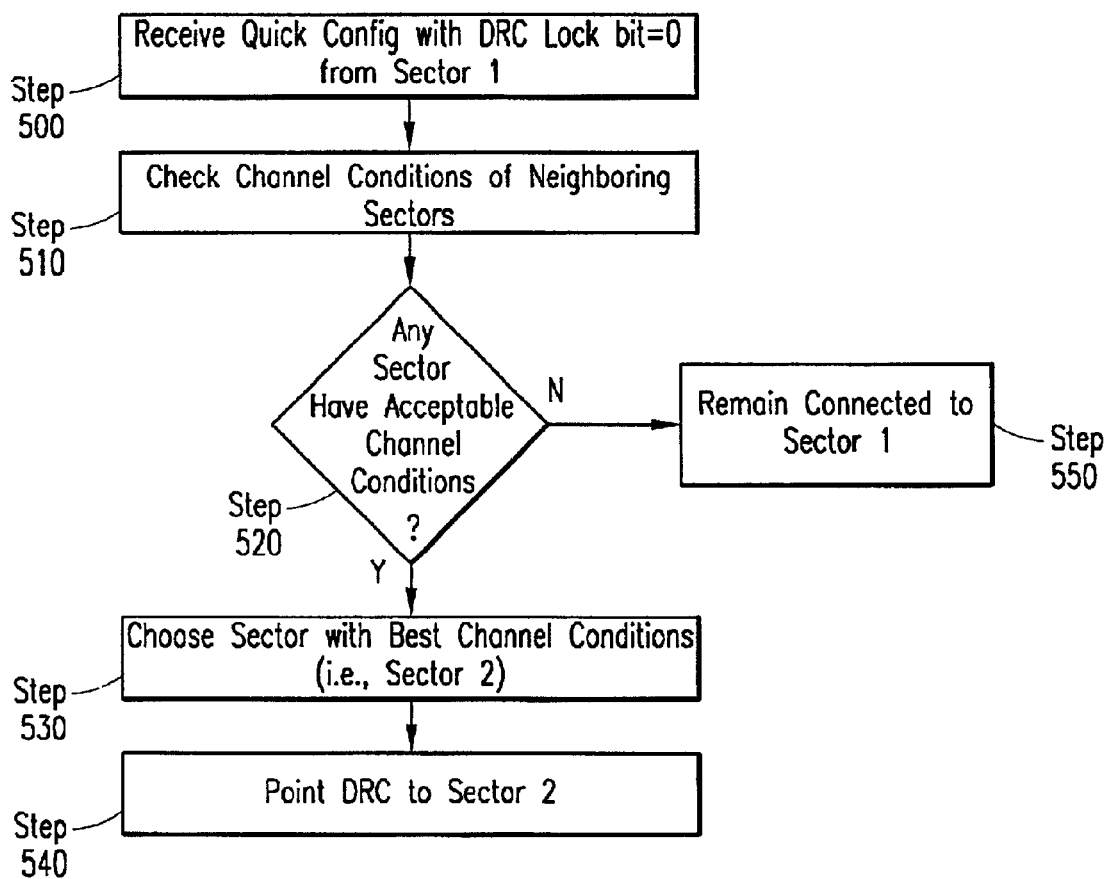
FIG. 5 is a flow chart illustrating exemplary steps for performing the "virtual" handoff shown in FIG. 4 of the drawings.

The exemplary steps for performing such a "virtual" handoff are shown in FIG. 5. As discussed above, when HDR mobile terminal MT-A receives the QuickConfig message with the DRC Lock bit set to "0"from sector 1 (step 500), MT-A checks the channel conditions of neighboring sectors (step 510). If any of the neighboring sectors has acceptable channel conditions to support the data session for MT-A (step 520), MT-A chooses the sector with the best channel conditions (i.e., sector 2) (step 530) and points its DRC towards that sector (step 540). As discussed above, queued data in the old sector is either retrieved by the new sector or flushed and retransmitted to the new sector. However, if no sector has acceptable channel conditions (step 520), MT-A remains connected to sector 1 by once again pointing it's DRC towards sector 1 (step 550).

Since HDR mobile terminals select the sector, even if the modified QuickConfig message is sent to the HDR mobile terminal, if the HDR mobile terminal does not update it's DRC cover index to "0", the HDR mobile terminal remains connected to that sector. The above described load sharing process endeavors to increase the average throughput rate on a sector. Therefore, if MT-A remain connected to sector 1, the throughput rate experience by MT-A may be lower than the requested throughput rate.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system within a Code Division Multiple Access 2000 (CDMA2000) network, said CDMA2000 network having a base station serving a sector, said base station further having a queue therein for storing data packets associated with data sessions involving one or more mobile terminals whose respective data rate controls (DRC) are pointed towards said sector, said queue having a size, said telecommunications system comprising:

an overhead message handler adapted to receive said queue size and compare said queue size with a predefined threshold wherein said queue size is the amount of data packets stored within said queue to be transmitted to said one or more mobile terminals associated with said sector;

means for selecting one or more of said mobile terminals when said queue size exceeds said predefined threshold; and means for transmitting a respective message to said selected one or more mobile terminals, said message instructing said selected one or more mobile terminals to not point their said respective DRCs towards said sector.

2. The telecommunications system of claim 1, further comprising:

a base station controller connected with said base station, said overhead message handler being within said base station controller.

3. The telecommunications system of claim 1, wherein said message is a QuickConfig message.

4. The telecommunications system of claim 3, wherein each said QuickConfig message includes a DRC Lock field, said DRC Lock field having a bit set to 0 indicating that said DRC of said respective selected mobile terminal is not valid.

5. The telecommunications system of claim 4, wherein each said QuickConfig message includes a Reserved field, said Reserved field having one or more bits set to a MACIndex associated with said respective selected mobile terminal.

6. The telecommunications system of claim 1, wherein said means for selecting comprises mobile terminal selection logic adapted to analyze one or more factors to select said selected one or more mobile terminals to discontinue using said sector for said respective data sessions.

7. The telecommunications system of claim 1, wherein said selected one or more mobile terminals set their DRC cover index to 0 in response to receipt of said message.

8. The telecommunications system of claim 1, wherein said selected one or more mobile terminals perform virtual handoffs to one or more adjacent sectors of said base station by pointing their respective DRCs towards the adjacent sectors.

9. The telecommunications system of claim 1, wherein said base station is a high data rate (HDR) base station having a data only carrier capable of providing only data service to said one or more mobile terminals.

10. A telecommunications system for load sharing within a Code Division Multiple Access 2000 (CDMA2000) network, said telecommunications system comprising:

a base station serving a sector, said base station further having a queue therein for storing data packets associated with data sessions involving one or more mobile terminals whose respective data rate controls (DRCs) are pointed towards said sector, said queue having a size; and a base station controller storing a predefined threshold for said sector therein, said base station controller being adapted to receive said queue size from said base station and compare said queue size with a predefined threshold wherein said queue size is the amount of data packets stored within said base station to be transmitted to said one or more mobile terminals, said base station controller being further adapted to select one or more of said mobile terminals when said queue size exceeds said predefined threshold and transmit a respective message to said selected one or more mobile terminals instructing said selected one or more mobile terminals to not point their respective DRCs towards said sector.

11. The telecommunications system of claim 10, wherein said message is a QuickConfig message.

12. The telecommunications system of claim 11, wherein each said QuickConfig message includes a DRC Lock field, said DRC Lock field having a bit set to 0 indicating that said DRC of said respective selected mobile terminal is not valid.

13. The telecommunications system of claim 12, wherein each said QuickConfig message includes a Reserved field, said Reserved field having one or more bits set to a MACIndex associated with said respective selected mobile terminal.

14. The telecommunications system of claim 10, wherein said selected one or more mobile terminals set their DRC cover index to 0 in response to receipt of said message.

15. The telecommunications system of claim 10, wherein said selected one or more mobile terminals perform virtual handoffs to one or mare adjacent sectors of said bass station by pointing their respective DRCs towards the adjacent sectors.

16. The telecommunications system of claim 10, wherein said base station is a high data rate (HDR) base station having a data only carrier capable of providing only data service to sold one or more mobile terminals.

17. A Base Station Controller within a Code Division Multiple Access 2000 (CDMA2000) network, said Base Station Controller comprising:

a predefined threshold for a sector associated with said Base Station Controller, said sector having one or more mobile terminals therein each pointing their respective Data Rate Control (DRC) towards said sector for a respective data session, said sector having a queue associated therewith, said queue storing data packets associated with said data sessions, said queue having a size wherein said queue size is the amount of data packets stored within said queue to be transmitted to said one or more mobile terminals associated with said sector;

an overhead message handler adapted to receive said queue size and compare said queue size with said predefined threshold; and selection logic adapted to select one or more of said mobile terminals when said queue size exceeds said predefined threshold and cause said Base Station Controller to transmit a respective message to said selected one or more mobile terminals, said message instructing said selected one or more mobile terminals to not point their respective DRCs towards said sector.

18. The Base Station Controller of claim 17, wherein said message is a QuickConfig message.

19. The Base Station Controller of claim 18, wherein each said QuickConfig message includes a DRC Lock field, said DRC Lock field having a bit set to 0 indicating that said DRC of said respective selected mobile terminal is not valid.

20. The Base Station Controller of claim 19, wherein each said QuickConfig message includes a Reserved field, said Reserved field having one or more bits set to a MACIndex associated with said respective selected mobile terminal.

21. A method for load shaming within a Code Division Multiple Access 2000 (CDMA2000) network, said method comprising:

storing a predefined threshold for a sector of said CDMA2000 network, said sector having a queue associated therewith for storing data packets associated with data sessions involving one or more mobile terminals whose respective data rate controls (DRCs) are pointed towards said sector, said queue having a size wherein said queue size is the amount of data packets stored within said queue to be transmitted to said one or more mobile terminals;

comparing said queue size with said predefined threshold; and if said queue size exceeds said predefined threshold, transmitting a respective message to selected ones of said one or more of said mobile terminals instructing said selected one or more mobile terminals to not point their respective DRCs towards said sector.

22. The method of claim 21, wherein each said message is a QuickConfig message, said step of transmitting further comprising:

setting a bit of a DRC Lock field of said QuickConfig message to 0 indicating that said DRC of said respective selected mobile terminal is not valid.

23. The method of claim 22, wherein said step of transmitting further comprises;

setting one or more bits of a Reserved field of each said QuickConfig message to a MACIndex associated with said respective selected mobile terminal.

24. The method of claim 21, further comprising:

setting the DRC cover index of each of said selected one or more mobile terminals to D in response to receipt of said message.

25. The method of claim 21, further comprising:

performing virtual handoffs by said selected one or more mobile terminals to one or more adjacent sectors by pointing their respective DRCs towards said one or more adjacent sectors.

26. The method of claim 21, wherein said step of transmitting further comprises:

analyzing one or more factors to select said selected one or more mobile terminals to discontinue using said sector for said respective data sessions.

* * * * *